United States Patent [19]
Mizukawa

[11] Patent Number: 5,390,047
[45] Date of Patent: Feb. 14, 1995

[54] STEREOVIEWER AND PACKAGE
[75] Inventor: Shigeo Mizukawa, Omiya, Japan
[73] Assignee: Fuji Photo Optical Co., Ltd., Saitama, Japan
[21] Appl. No.: 46,806
[22] Filed: Apr. 16, 1993
[30] Foreign Application Priority Data
  Apr. 21, 1992 [JP] Japan .............................. 4-033506[U]
[51] Int. Cl.6 ............................................. G02B 27/04
[52] U.S. Cl. .................................... 359/466; 359/474; 359/477
[58] Field of Search ......................... 359/466, 474, 477

[56]      References Cited
    U.S. PATENT DOCUMENTS
  5,218,470  6/1993  Mizukawa et al. .................. 359/466
    FOREIGN PATENT DOCUMENTS
  2245079  12/1991  United Kingdom ................. 359/477

*Primary Examiner*—Eugene R. LaRoche
*Assistant Examiner*—F. Niranjan
*Attorney, Agent, or Firm*—Ronald R. Snider

[57]        ABSTRACT

A stereoviewer and package for facilitating the immediate observation of a stereo pair of photographs and enabling all people to adjust the focal length to their own least distance of distinct vision. A box-shaped main body case for accommodating stereoscopic photographs and a lid case attached to the main body case so as to be slidable thereon serves as a package which is opened and closed by the sliding operation of both cases. A holder portion is provided on the rear surface, for example, of the main body case so as to position and hold the stereoscopic photographs in a standing state, and binocular lenses are disposed on the front surface of the lid case so as to view the stereoscopic photographs therethrough. The rear surface of the main body case and the front surface of the lid case are inclined in such a manner that the side surfaces of the stereoviewer are in a shape of a trapezoid when the main body case is attached upside down to the lid case at the time of observation. It is thus possible to view the vertically central portion of the stereoscopic photographs through the binocular lenses, and is also possible to change the distance between the binocular lenses and the stereoscopic photographs by the sliding operation of both cases.

4 Claims, 4 Drawing Sheets

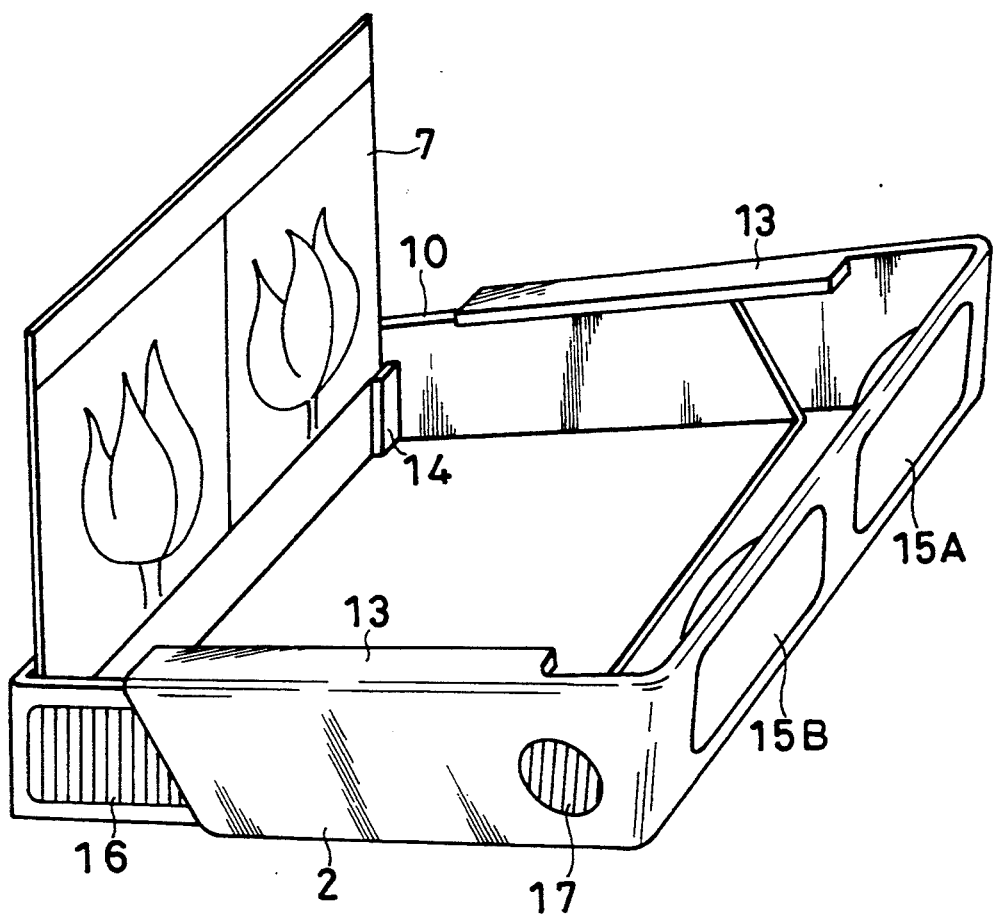

STEREOVIEWER AND PACKAGE

BACKGROUND OF THE INVENTION

This application claims the priority of Japanese Patent Application No. 4-33506 (Utility Model) filed on Apr. 21, 1992, which is incorporated herein by reference.

1. Field of the Invention

The present invention relates to the structure of a stereoviewer and package and, more particularly, to a stereoviewer for facilitating the three-dimensional observation of stereoscopic photographs.

2. Description of the Prior Art

A stereoviewer is an apparatus for viewing a subject three-dimensionally by viewing through binocular lenses a pair of photographs of the same object which are taken from rightward and leftward points. Such a stereo pair of photographs are taken by a stereoscopic camera equipped with two photographing lenses.

FIG. 5 is an external view of the stereoscopic camera. The stereoscopic camera is composed of a main body 1 provided with a finder 2 and a shutter button 3, and two matched photographing lenses 4, 5 provided on the front surface of the main body 1 with a predetermined interval between the two lenses 4, 5. A subject to be taken is positioned through the finder 2 and taken on the film mounted on the main body 1 through the photographing lenses 4, 5 by pressing the shutter button 3. Two images caught from different angles are thus projected side by side on the film.

FIG. 6 shows the structure of a conventional simple stereoviewer. A stereo pair of photographs 7 ( hereinunder referred to as "stereoscopic photographs") printed on photographic paper from the film is inserted into a photograph holder 6A of the stereoviewer body 6. The stereoviewer is provided with binocular lenses 8A, 8B so as to view the stereoscopic photographs 7 therethrough at a least distance of distinct vision. By viewing the stereoscopic photographs 7 through the binocular lenses 8A, 8B, it is possible to view the images as a three-dimensional image.

Since the conventional stereoviewer shown in FIG. 6 is handled separately from the stereoscopic camera shown in FIG. 5, the user cannot view a three-dimensional image immediately after he receives the images printed on photographic paper as the stereoscopic photographs 7, which causes considerable inconvenience to the user. In addition, since the stereoviewer is manufactured separately from the stereoscopic camera, the manufacturing cost separate from that of the stereoscopic camera is needed. Therefore, it is required to keep down the manufacturing cost in order to reduce the expense born by the user.

In addition, since the binocular lenses 8A, 8B are disposed at a predetermined least distance of distinct vision from the stereoscopic photographs 7 at which the focal length of the binocular lenses 8A, 8B is adjusted for people with normal eyesight, it is not always possible for all people having different eyesights to effectively adjust the focal length of the binocular lenses 8A, 8B.

SUMMARY OF THE INVENTION

Accordingly, it is an object of the present invention to eliminate the above-described problem in the prior art and to provide a stereoviewer and package which immediately facilitates the observation of stereoscopic photographs, which can reduce the manufacturing cost thereof, and which is capable of adjusting the focal length of the binocular lenses to the least distance of distinct vision for all people having different eyesights.

To achieve this aim, the present invention provides a stereoviewer and package comprising: a package including a box-shaped main body case for accommodating stereoscopic photographs, and a lid case attached to the main body case in such a manner as to be horizontally slidable so as to open and close the package; a holder portion attached on the rear surface of either of the main body case and the lid case so as to position and hold the stereoscopic photographs in a standing state; and binocular lenses provided on the front surface of the other case so as to view the stereoscopic photographs therethrough; thereby enabling the distance between the binocular lenses and the stereoscopic photographs to be changed by the sliding operation of both cases when the user views the stereoscopic photographs three-dimensionally.

In this case, the main body case may be formed with the top surface side open and the lid case with the bottom surface side open, so that the lid case is attached upside down to the main body case when the user views the stereoscopic photographs. The rear surface of the main body case and the front surface of the lid case may be inclined in such a manner that the side surfaces of the stereoviewer are in a shape of a trapezoid when the main body case is covered with the lid case, and that the binocular lenses face the center position of the stereoscopic photographs when the lid case is attached upside down to the main body case and the stereoscopic photographs are held by the holder portion in a standing state.

According to the above-described structure, this stereoviewer and package which is opened and closed by sliding the lid case can accommodate stereoscopic photographs. That is, the stereoviewer and package functions as a package. In addition, when the lid case is attached to the main body case upside down, for example, and the stereoscopic photographs are inserted into the holder portion provided on the main body case in a standing state, a three-dimensional image is observed through the binocular lenses provided on the lid case. That is, the stereoviewer and package also serves as a stereoviewer. At this time, it is possible to change the distance (a least distance of distinct vision) between the binocular lenses and the stereoscopic photographs by sliding the lid case along the main body case, thereby enabling all people having different eyesights to view the stereoscopic photographs three-dimensionally at their own least distances of distinct vision.

The above and other objects, features and advantages of the present invention will become clear from the following description of the preferred embodiment thereof, taken in conjunction with the accompanying drawings.

BRIEF DESCRIPTION OF THE DRAWINGS

FIG. 1 is a perspective view of the structure of an embodiment of a stereoviewer and package (at the time of observation of stereoscopic photographs) according to the present invention;

DESCRIPTION OF THE PREFERRED EMBODIMENT

Figure 2A:
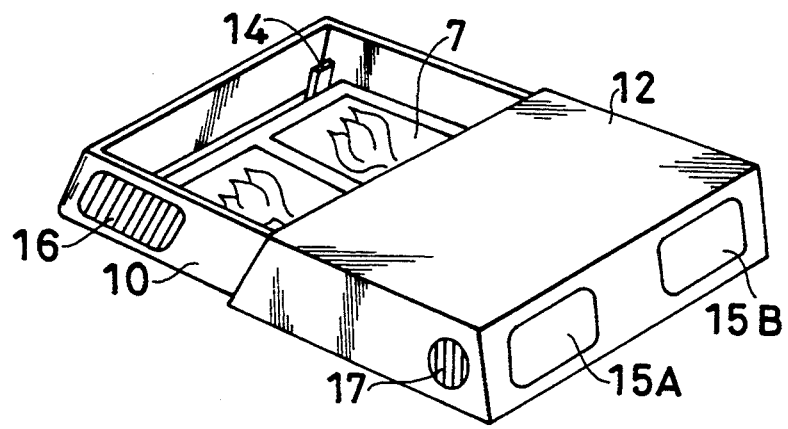
FIGS. 2A to 2C are perspective views of the embodiment shown in FIG. 1 showing the steps of using it.
Figure 2B:
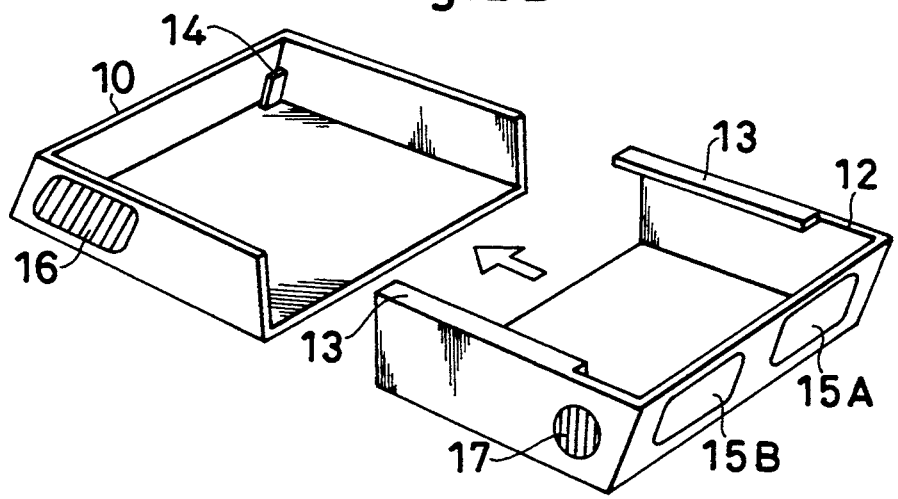
Figure 2C:
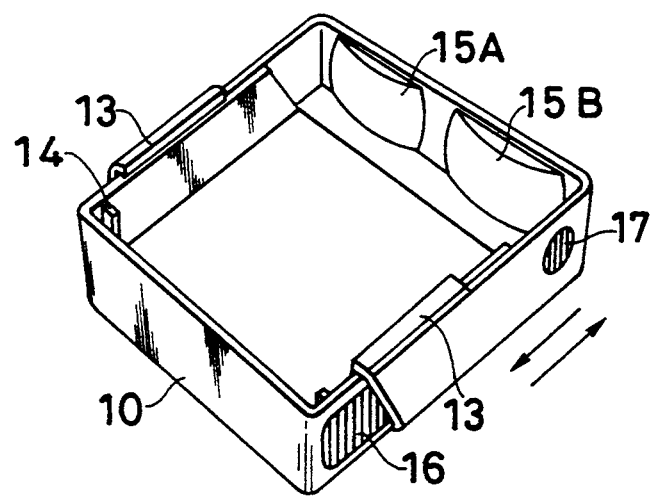

FIG. 1 shows the structure of an embodiment of a stereoviewer and package (at the time of observation of stereoscopic photographs) according to the present invention, and FIGS. 2A to 2C show the steps of using it. A main body case 10 is made of a paper or plastic material and is formed in a shape of a box having trapezoidal side surfaces. The upper surface and either of the front surface and the rear surface of the main body case 10 are open, as shown in FIG. 1. The main body case 10 can accommodate plural pairs of stereoscopic photographs 7, as shown in FIG. 2A. A lid case 12 is made of the same material as that of the main body case 10 and is formed in a shape of a trapezoidal box which is slightly larger than the main body case 10. The bottom surface and either of the front surface and the rear surface of the lid case 12 are open surfaces (the lid case 12 is attached to the main body case 10 upside down in FIG. 1). Guiding pieces 13 are attached to both side surfaces of the bottom of the lid case 12 so as to hold and slide the main body case 10 therealong. It is therefore possible to slidably combine both cases 10 and 12 with their open rear and front surfaces faced to each other.

On the opposite surface (rear surface in FIG. 1) to the open surface of the main body case 10, two projection pieces 14 are provided in such a manner as to protrude from the right and left side surfaces in parallel with the rear surface. The projection pieces 14 and the rear surface constitute a holder portion attached to the rear surface of either of said main body case and said lid case for holding the stereoscopic photographs 7. According to the holder portion, it is possible to hold the stereoscopic photographs 7 in a standing state between the rear surface of the main body case 10 and the projection pieces 14, as shown in FIG. 1. To the opposite surface (front surface in FIG. 1) to the open surface of the lid case 12 binocular lenses 15A, 15B of a plastic material are attached so that the stereoscopic photographs 7 held by the holder portion are set at a least distance (about 25 cm) of distinct vision.

Figure 3:
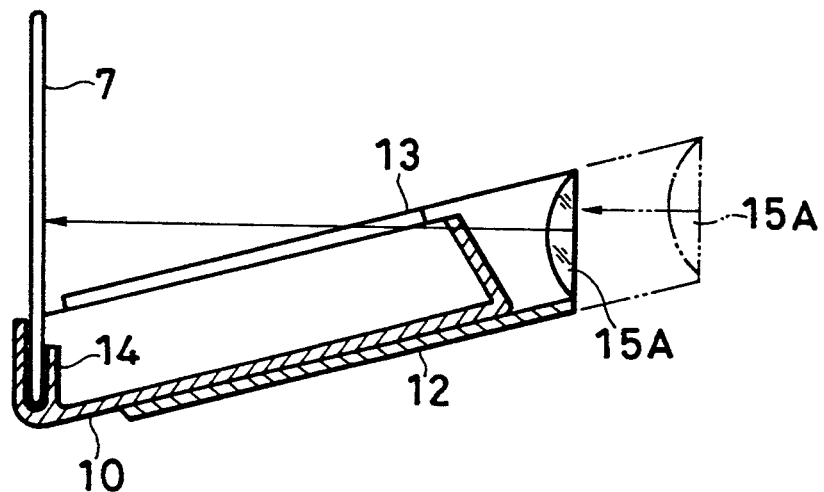
FIG. 3 shows the positional relationship between the stereoscopic photographs and the binocular lenses in the embodiment at the time of the observation of stereoscopic photographs.

In FIG. 3, this embodiment functions as a stereoviewer. Since the rear surface of the holder portion and the front surface to which the binocular lenses are attached correspond to the side surfaces of a trapezoid, when either of them is turned upside down, these surfaces become parallel with each other, and the binocular lenses 15 are flush with approximately the vertically central portion of the stereoscopic photographs 7 held by the holder portion. Non-slip portions 16 and 17 are provided on the right and left side surfaces of the main body case 10 and the lid case 12, respectively.

Figure 4:
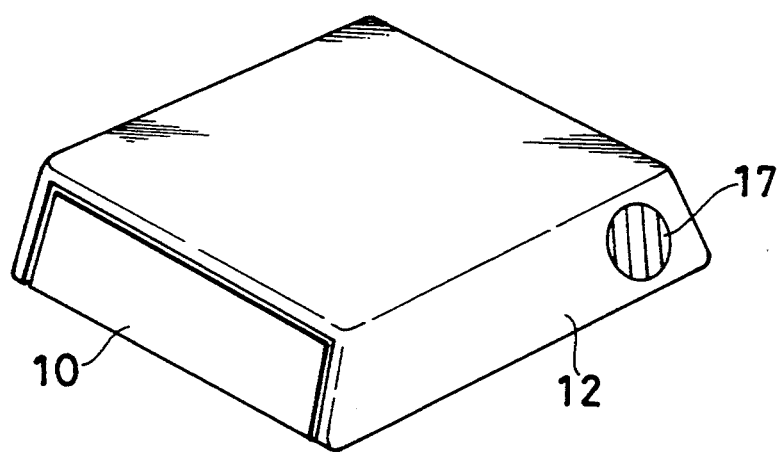
FIG. 4 is a perspective view of the embodiment when it is used as a package.
Figure 5:
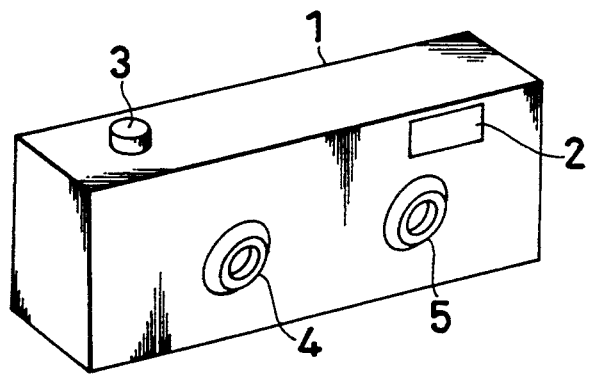
FIG. 5 is a perspective view of the structure of a conventional stereoscopic camera.
Figure 6:
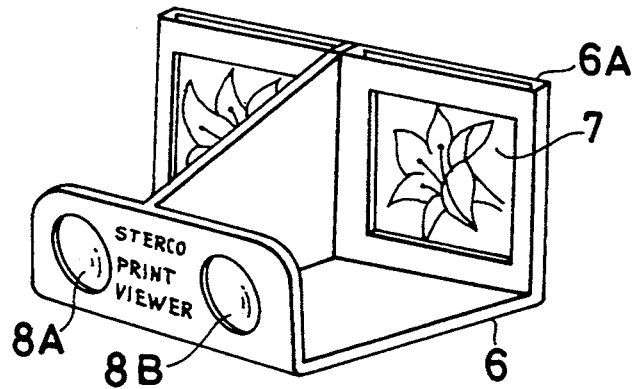
FIG. 6 is a perspective view of the structure of a conventional stereoviewer.

According to the stereoviewer and package having the above-described structure, the lid case 12 slides along the guiding pieces 13 on the main body case 10 when accommodating the stereoscopic photographs 7, as shown in FIG. 2(A). That is, the stereoviewer and package functions as a package for accommodating the stereoscopic photographs 7. FIG. 4 shows the embodiment in the state in which the lid case 12 is completely closed.

When the lid case 12 is re-attached upside down to the main body case 10, as shown in FIG. 2(B), and is horizontally slid thereon, as shown in FIG. 2(C), the stereoviewer and package functions as a stereoviewer. In this case, the stereoscopic photographs 7 are set by the holder portion composed of the projection pieces 14 and the rear surface of the case 10, as shown in FIG. 1.

In this way, the stereoscopic photographs 7 held by the holder portion are observed through the binocular lenses 15A, 15B attached to the lid case 12, as shown in FIG. 3. In this case, since the main body case 10 and the lid case 12 are in a shape of a trapezoid and the lid case 12 is attached upside down to the main body case 10, the binocular lenses 15A, 15B are disposed so as to face the vertically central portion of the stereoscopic photographs 7, as shown in FIG. 3, thereby enabling the user to satisfactorily view the stereoscopic photographs as a whole. In this state, the binocular lenses 15A, 15B are disposed at approximately a least distance of distinct vision from the stereoscopic photographs 7. In the present invention, since the lid case 12 slides in the direction indicated by the chain lines in FIG. 3, it is possible to change the distance between the stereoscopic photographs 7 and the binocular lenses 15A, 15B, thereby enabling each observer to adjust the focal length of the binocular lenses 15A, 15B to his own least distance of distinct vision.

Although the holder portion and the binocular lenses 15A, 15B are provided on the main body case 10 and the lid case 12, respectively, in this embodiment, the binocular lenses 15A, 15b may be attached to the main body case 10 and the holder portion may be provided on the lid case 12. In addition, the guiding pieces 13 provided on the lid case 12 so as to guide the lid case 12 along the periphery of the side surface of the main body case 10 may be replaced by guide grooves provided at the center portions or both edge portions of the side surfaces of the main body case 10 so that the lid case 12 slides therein.

As described above, according to the present invention, a stereoviewer which also can function as a package is obtained. According to this stereoviewer and package, it is possible for all people having different eyesights to adjust the focal length of binocular lenses at their own least distances of distinct vision by freely changing the distance between the stereoscopic photographs and the binocular lenses at the time of observation, thereby enabling the user to view a three-dimensional image satisfactorily.

What is claimed is:

1. A stereoviewer and package, comprising:
    a package including a box-shaped main body case having a space for accommodating stereoscopic photographs, and a lid case attached to said main body case in such a manner as to be horizontally slidable so as to open and close said package;
    a holder portion attached to the rear surface of either of said main body case and said lid case so as to position and hold said stereoscopic photographs in a standing state;
    binocular lenses provided on the front surface of the other case so as to view said stereoscopic photographs therethrough, thereby enabling the distance between said binocular lenses and said stereoscopic photographs to be changed by the sliding operation of both cases when the user views said stereoscopic photographs three-dimensionally; and wherein said main body case is formed with the top surface open and said lid case with the bottom surface open, so that said lid case is attached upside down to said main body case when the user views said stereoscopic photographs.

2. A stereoviewer and package according to claim 1, wherein the rear surface of said main body case and the front surface of said lid case are inclined in such a manner that the side surfaces of said stereoviewer and package is in a shape of a trapezoid when said main body case is covered with said lid case, and that said binocular lenses face the vertically central portion of said stereoscopic photographs when said lid case is attached upside down to said main body case and said stereoscopic photographs are held by said holder portion in a standing state.

3. A stereoviewer and package according to claim 1, wherein non-slip portions are provided on the side surfaces of said main body case and/or said lid case.

4. A stereoviewer and package according to claim 1, wherein when said lid case is attached upside down to said main body case, the side surfaces of said stereoviewer and package is in the shape of a parallelogram.

* * * * *